Aug. 28, 1951 J. E. HAUSER 2,566,025
METHOD OF MAKING SOLID RUBBER RINGS
Filed May 1, 1948
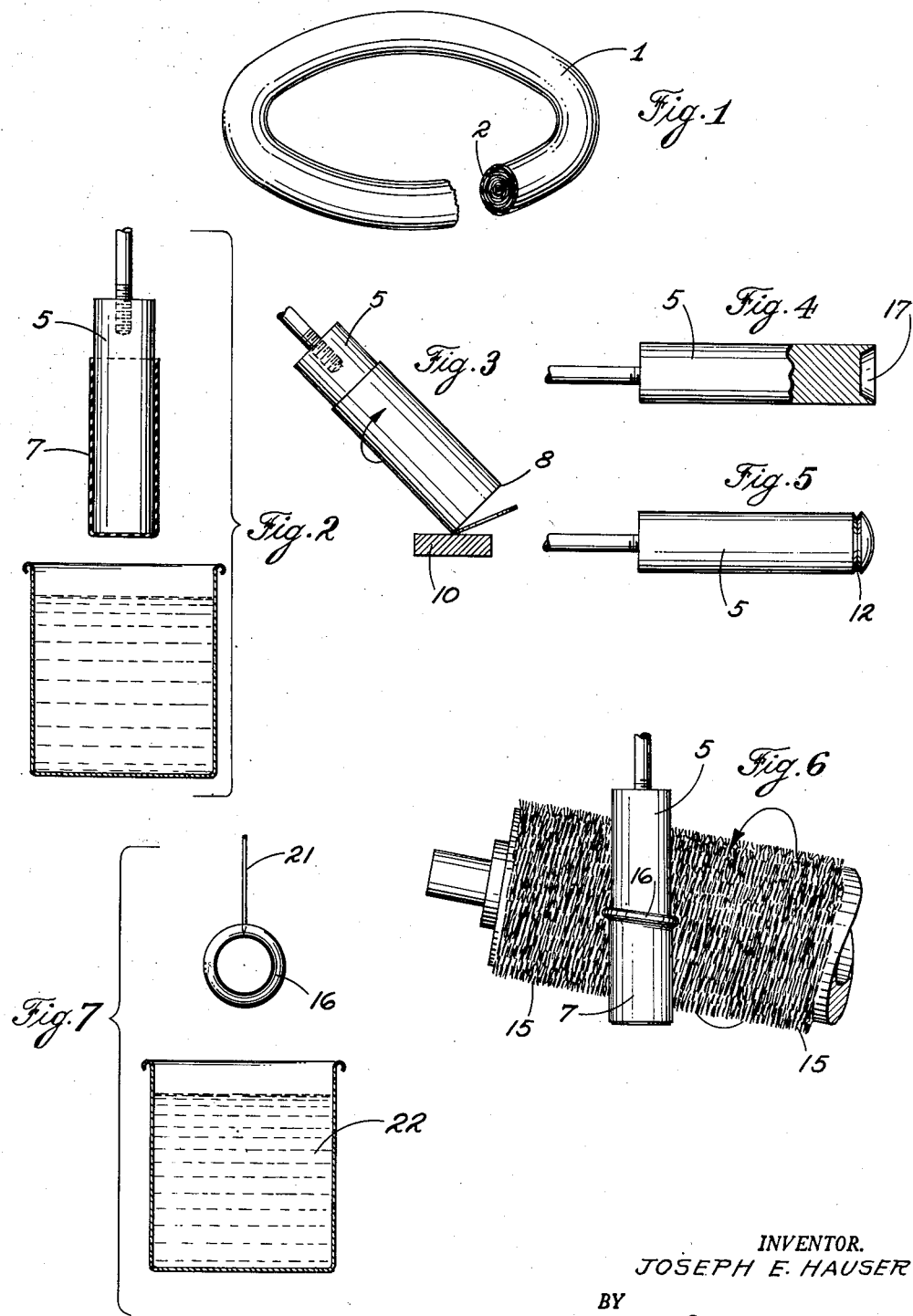
INVENTOR.
JOSEPH E. HAUSER
BY
Richey & Watts
ATTORNEYS Patented Aug. 28, 1951

2,566,025

UNITED STATES PATENT OFFICE 2,566,025

METHOD OF MAKING SOLID RUBBER RINGS

Joseph E. Hauser, Akron, Ohio, assignor to The Serugo Rubber Company, Cuyahoga Falls, Ohio, a corporation of Ohio Application May 1, 1948, Serial No. 24,659

1 Claim. (Cl. 18—47.5)

This invention relates generally to the art of making flexible, non-metallic rings comprising organic compositions such as natural or synthetic rubber or plastic material.

It has been common heretofore to make rubber rings by molding procedures but such rings are expensive because of the number of steps involved and are not of the highest quality such as tensile strength, elongation and resiliency because of the amount of loading material required in rubber which is to be molded. A large demand for better quality and cheaper flexible, non-metallic rings has long existed and has never been satisfied, so far as I know. The present invention satisfies that demand by providing a new method of making such rings from liquids containing organic compositions such as natural rubber, i. e., solutions or dispersions of rubber, including latex, synthetic rubber and resins and various plastic compositions.

In the drawings accompanying and forming a part of this specification,

Fig. 1 shows a ring embodying the present invention; and

Figs. 2, 3, 4, 5, 6, and 7 are largely diagrammatic views illustrating apparatus which may be used to carry out the present process.

The ring of the present invention is illustrated in Fig. 1 where 1 indicates a compact annulus made by rolling an open ended cylindrical film of natural rubber or other suitable material upon itself and 2 indicates a film of rubber or other suitable material which surrounds the compact roll 1. It will be understood that both the film, which constitutes annulus or roll 1 of the ring, and the film 2, which surrounds that roll, are preferably composed of latex but may be made from other liquids containing natural or synthetic rubber, solutions or dispersions of natural rubber and other plastic compositions in liquid form. Preferably the compositions used should produce a ring which is elastomeric. When latex is used the resulting ring will be of the highest quality rubber, will have a high degree of elongation and high tensile strength, and will be quite resilient and substantially solid. Such a ring will be substantially impervious to the flow of gas or liquid therethrough and can be stretched so as tightly to engage a surface which it surrounds. In short, it forms an ideal packing member for many operating conditions.

As is indicated by the drawings and as necessarily follows from the processes described, the finished ring 1 has a smooth surface, is substantially uniform in cross-sectional size throughout and is substantially free from lumps, knots, bulges and other non-uniformities which might militate against its effectiveness as a packing ring.

The present invention also includes, as above noted, a new method of making rings such as the one just described. This method comprises a small number of steps which may be readily and cheaply carried out with the use of simple apparatus operated mechanically or by hand, as desired.

The first illustrated step of the present method is to deposit a film of the selected composition on a cylindrical form. As is shown in Fig. 2, this may be done by dipping a form 5 of the desired size into a quantity of a liquid 6 containing the composition, for example, latex, combined with vulcanizing or curing and other conventional ingredients. The form 5 is dipped into the liquid and is manipulated, if necessary, with simultaneous removal of liquid so that a film 7 of the composition deposits on the form. The film may be increased in thickness by repeating this dipping procedure if desired, or the thickness desired may be attained within limits by varying the length to which the form is dipped into the liquid, or by varying the nature and amount of coagulants, the temperature of the liquid and the method of curing. The thickness of the ring will vary with the thickness and length of the film. It is thus apparent that the size of the ring may be controlled readily in several different ways.

When the film on the form is of the desired thickness and length, the part of the film covering the free end of the form is removed. One manner of removing this end part of the film is shown in Fig. 4 where the form 5 is shown as having a sharp edge 8 at the intersection of the cylindrical side wall and the end wall, and this sharp edge 8 is rolled on a steel plate 10 under pressure. In this manner the part of the film covering the end of the form is severed from the remainder of the film and may be removed and discarded. Alternatively, the plate 10 may be heated and the end of the film may thus be removed by a combination of heating and cutting with pressure. The end of the form may be countersunk as indicated at 17 in Fig. 4, which tends to facilitate severance of the film covering the end of the form.

In Fig. 5 the form is shown as having a narrow annular groove 12 near the free end thereof. A knife may be used to sever the film at the end of the article by pressing the knife into this groove while the knife moves around the form or while the knife remains stationary and the form rotates.

Following removal of the part of the film which covered the end of the form, the then open ended rubber film is rolled off the form in any convenient manner, for example, by the inclined rotating brush 15 which is illustrated in Fig. 6. As will be understood from this figure, the film is rolled upon itself and off the form. Since the film is in an unvulcanized or otherwise uncured condition, the turns of the film adhere tenaciously to one another and the annulus or roll 16, as it leaves the form, is quite compact and substantially solid.

This annulus or roll 16 may be vulcanized or otherwise cured and is then ready for use but, preferably, it is coated with a film of suitable material such, for example, as that which was initially deposited on the form. This covering film may be made by dipping the compact roll, before or after it is vulcanized or otherwise cured and preferably before such vulcanizing or curing, into a liquid containing the material, as is shown in Fig. 7 where 21 indicates any suitable holder for the roll and 22 indicates the liquid rubber bath.

When the roll is vulcanized before the dipping shown in Fig. 7, the dipped film is vulcanized or otherwise cured after that dip. Then the resulting new ring is ready for use.

While the steps of the process as described above can be carried out by hand with the apparatus shown in the drawings, it will be understood by those skilled in the art that these steps may also be carried out by many other types of hand apparatus and also by apparatus which operates more or less completely in an automatic manner.

Having thus described the present invention so that others skilled in the art may be able to understand and practice the same, I state that what I desire to secure by Letters Patent is defined in what is claimed.

What is claimed is:

The method of making rubber rings having smooth surfaces and substantially uniform cross-sectional size throughout which comprises the steps of depositing a film of rubber on a cylindrical form, severing the film circumferentially adjacent to the intersection of the cylindrical side and the free end walls of the form, removing the part of the film covering one end of the form, rolling the resultant open ended cylindrical film upon itself to its severed end and off the said end of the form to make a compact, substantially solid ring, curing the rubber of the ring, covering the ring with a film of rubber and curing said film of rubber.

JOSEPH E. HAUSER.

REFERENCES CITED

The following references are of record in the file of this patent:

UNITED STATES PATENTS

| Number | Name | Date |
|---|---|---|
| 140,472 | Collins | July 1, 1873 |
| 2,076,949 | Kirby | Apr. 13, 1937 |
| 2,322,858 | Limbert | June 29, 1943 |
| 2,427,305 | Sander | Sept. 9, 1947 |